US012658634B2

(12) United States Patent

Meyer et al.

(10) Patent No.: US 12,658,634 B2

(45) Date of Patent: Jun. 16, 2026

(54) CABLE CONNECTOR

(71) Applicant: NKT GmbH, Nordenham (DE)

(72) Inventors: Stephan Meyer, Brake (DE); Stefan Schröder, Brake (DE); Björn Spiers, Schwanstetten (DE)

(73) Assignee: NKT GmbH, Nordenham (DE)

( * ) Notice: Subject to any disclaimer, the term of this patent is extended or adjusted under 35 U.S.C. 154(b) by 131 days.

(21) Appl. No.: 18/498,322

(22) Filed: Oct. 31, 2023

(65) Prior Publication Data

US 2024/0145986 A1 May 2, 2024

(30) Foreign Application Priority Data

Oct. 31, 2022 (EP) ..................................... 22204710

(51) Int. Cl.
| | |
|---|---|
| *H01R 103/00* | (2006.01) |
| *H01R 13/53* | (2006.01) |
| *H01R 13/66* | (2006.01) |
| *H01R 24/66* | (2011.01) |
| *H02B 13/075* | (2006.01) |

(52) U.S. Cl.
CPC ......... *H01R 13/53* (2013.01); *H01R 13/6666* (2013.01); *H01R 24/66* (2013.01); *H02B 13/075* (2013.01); *H01R 2103/00* (2013.01)

(58) Field of Classification Search
CPC ......... F03D 80/85; H01F 27/04; H01R 13/53; H01R 13/6666; H01R 13/66; H01R 103/00; H01R 2103/00; H01R 24/66; H02B 13/075; Y02E 10/72
USPC ....................................................... 174/68.1
See application file for complete search history.

(56) References Cited

U.S. PATENT DOCUMENTS

2014/0024241 A1* 1/2014 Siebens ................ H01R 13/207
439/310
2016/0352036 A1 12/2016 Kuhlefelt
(Continued)

FOREIGN PATENT DOCUMENTS

| CN | 201369197 Y | 12/2009 |
|---|---|---|
| EP | 2688153 A2 | 1/2014 |
| EP | 2688153 A3 | 3/2014 |

(Continued)

OTHER PUBLICATIONS

IHI Connectors Mechanical Screw Wire & Cable Terminal Lugs_p. 1_Aug. 2020.*

(Continued)

*Primary Examiner* — Timothy J Thompson
*Assistant Examiner* — Guillermo J Egoavil
(74) *Attorney, Agent, or Firm* — Whitmyer IP Group LLC

(57) ABSTRACT

A high-voltage connection system is described. The HV connection system includes a HV plug-connector and a HV socket-connector. The HV plug-connector is installed in an electrical HV unit to form an electrical connection between a second portion of a conductive core of the HV plug-connector and the electrical HV unit in a way that a plug extends outwards of the electrical HV unit. A HV cable with a cable lug is inserted in the HV socket-connector. One opening of the HV socket-connector is plugged on the plug of the HV plug-connector to align the conductive core with a center line of a second channel. An electric connection is created between the cable lug and the conductive core.

11 Claims, 5 Drawing Sheets

(56)            References Cited

U.S. PATENT DOCUMENTS

| | | | | |
|---|---|---|---|---|
| 2019/0326034 A1* | 10/2019 | Shin | ...................... | B32B 27/281 |
| 2021/0138425 A1* | 5/2021 | Watanabe | ............ | C09D 123/16 |

FOREIGN PATENT DOCUMENTS

| | | | | | | |
|---|---|---|---|---|---|---|
| EP | 3879095 | A1 | | 9/2021 | | |
| JP | 2018006030 | A | * | 1/2018 | | |
| KR | 20050019490 | A | * | 3/2005 | ............ | C08K 3/016 |
| KR | 1020050019490 | A | | 3/2005 | | |
| WO | 9610851 | A1 | | 4/1996 | | |
| WO | 2009006136 | A2 | | 1/2009 | | |
| WO | 2009006136 | A3 | | 3/2009 | | |
| WO | 2017097308 | A1 | | 6/2017 | | |
| WO | 2020158431 | A1 | | 8/2020 | | |

OTHER PUBLICATIONS

Extended European Search Report; Application No. 22204710.2; Completed: Apr. 3, 2023; Issued: Apr. 18, 2023; 9 Pages.

International Electrotechnical Commission (IEC); "Power cables with extruded insulation and their accessories for rated voltages above 30 kV (U subm /sub= 36 kV) up to 150 kV (U subm /sub=170 kV)—Test methods and requirements"; International Standard: IEC 60840, Edition 5.0; Rue de Varembé 3, PO Box 131, CH-1211 Geneva 20, Switzerland , May 19, 2020; 168 Pages.

European Office Action; Communication pursuant to Article 94(3) EPC; Application No. 22 204 710.2; Issued: Mar. 12, 2026; 8 Pages.

\* cited by examiner

CABLE CONNECTOR

TECHNICAL FIELD

Aspects of the present disclosure relate to a HV plug-connector, a HV socket-connector, and a HV connection system for creating an HV electrical connection via a HV plug-connector and a HV socket-connector. Further aspects relate to a wind turbine generator with a HV connection system for creating an HV electrical connection via a HV plug-connector and a HV socket-connector.

BACKGROUND

Typical cable connectors for connecting HV cables to electrical HV units consist essentially of straight plug-in connectors. The straight plug-in connectors comprise an inner-cone bushing which is installed in the electrical HV unit. The HV cable needs to extend into the electrical HV unit to connect the HV cable to the electrical HV unit via the inner-cone bushing. During installation of the HV cable this extra length, required for the HV cable to extend into the electrical HV unit, has to be considered. Typically, the HV cable has to be bent to reach the electrical connection spot of the electrical HV unit. The large diameter of the HV cables leads to an increased bending radius of the HV cables. Additional space has to be created for the bending radius, which leads to significant problems in areas with limited space. In narrow spaces this connection system can lead to installation problems. Typically, the HV cables have to be pushed into the inner-cone bushing. Due to the weight of the HV cables, pushing the HV cables into the inner-cone bushing requires auxiliary installation tools, such as pulleys or cranes, which require additional installation.

SUMMARY

It is therefore an object of the present disclosure to overcome at least some of the above-mentioned problems in the prior art at least partially.

In view of the above a high-voltage (HV) plug-connector, a high-voltage (HV) socket-connector, a high-voltage (HV) connection system and a wind turbine generator (WTG) system is described.

According to an aspect, a high-voltage (HV) plug connector is described. The HV plug connector includes: a conductive core; and a bushing isolating the conductive core. The bushing includes: a first isolation part isolating a first portion of the conductive core, wherein an outer surface of the first isolation part comprises a conical surface; a second isolation part isolating a second portion of the conductive core; and a mounting part extending radially beyond the first isolation part and the second isolation part; wherein the first isolation part and the first portion of the conductive core form a plug and the HV plug-connector is configured to be installed in an electrical HV unit to form an electrical connection between the second portion of the conductive core and the electrical HV unit in a way that the plug extends outwards of the electrical HV unit.

According to a further aspect, a high-voltage (HV) socket-connector is described. The HV socket-connector includes: a first channel configured to insert a HV cable with a cable lug; and a second channel having openings, an inner surface of the openings comprising a conical surface; wherein the second channel is overlapping the first channel and an opening of the cable lug aligns with a center line of the second channel.

According to a further aspect, a high-voltage (HV) connection system is described. The HV connection system includes a HV plug-connector according to aspects described herein and a HV socket-connector according to aspects described herein. The HV plug-connector is installed in an electrical HV unit to form an electrical connection between the second portion of the conductive core and the electrical HV unit in a way that the plug extends outwards of the electrical HV unit; one opening of the HV socket-connector is plugged on the plug of the HV plug-connector to align the conductive core with the center line of the second channel; and an electric connection is created between the cable lug and the conductive core.

According to a further aspect, a wind turbine generator (WTG) system is described. The WTG system includes a HV transformer, a HV gas-insulated switching gear (HV-GIS) and for each phase of the transformer a HV cable. At least for one phase: the HV cable is inserted in the first channel of a HV socket-connector according to any one of claims 6-9 to align a cable lug of the HV cable with the center line of the second channel of the HV socket-connector; a HV-plug connector according to any one of claims 1-5 is installed in the HV transformer to form an electrical connection between the second portion of the conductive core and the HV transformer in a way that the plug extends outwards of the transformer; one opening of the HV socket-connector is plugged on the plug of the HV plug connector to align the conductive core with the center line of the second channel; an electrical connection is created between the cable lug and the conductive core to electrically connect the HV cable to the HV transformer; and the HV cable is electrically connected to the HVGIS.

Further advantages, features, aspects, and details that can be combined with embodiments described herein are evident from the dependent claims, claim combinations, the description and the drawings.

BRIEF DESCRIPTION OF THE DRAWINGS

So that the manner in which the above recited features of the present disclosure can be understood in detail, a more particular description, briefly summarized above, may be had by reference to embodiments. The accompanying drawings relate to one or more embodiments and are described in the following.

DETAILED DESCRIPTION

Figure 1:
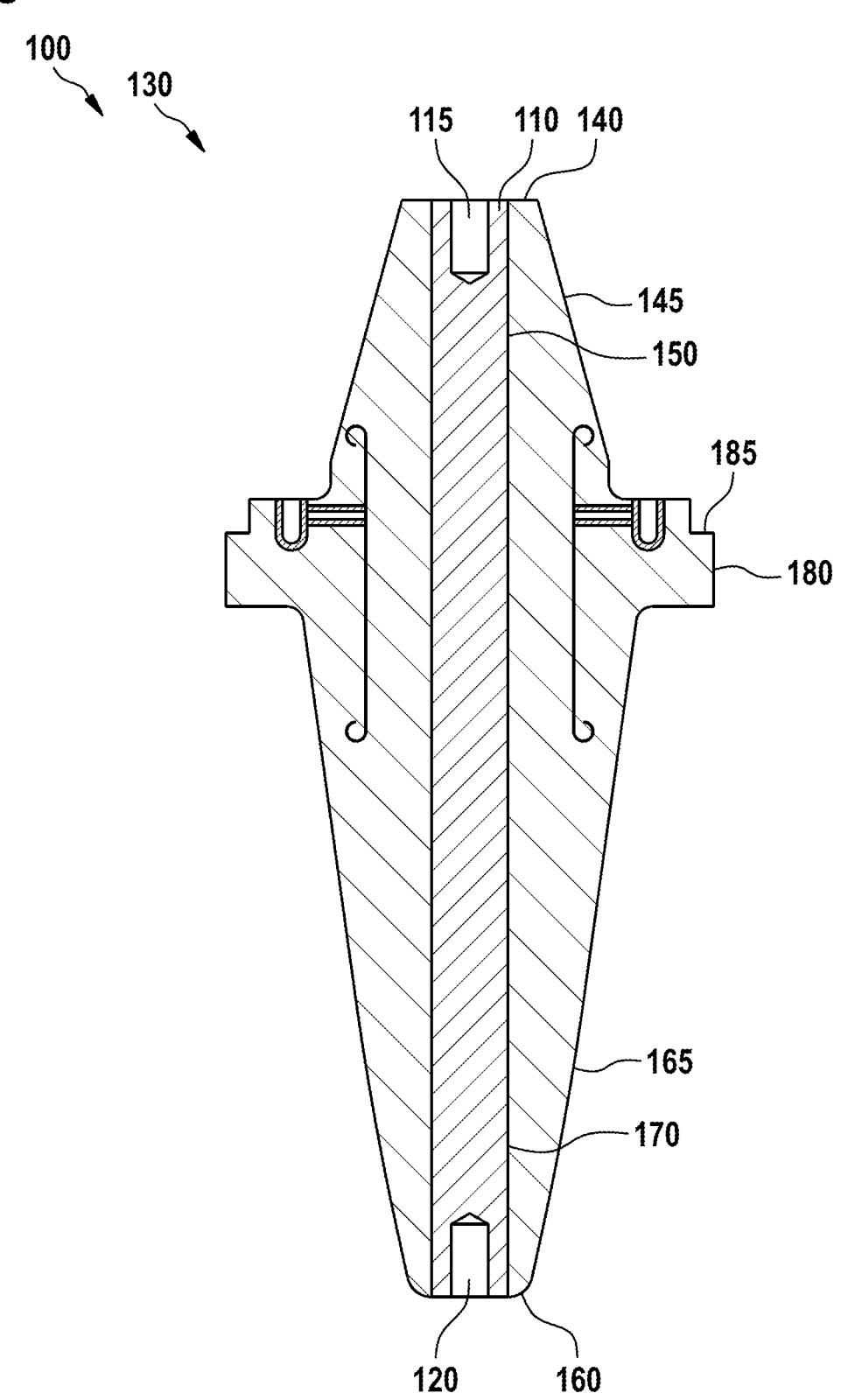
FIG. 1 shows a schematic view of a HV plug-connector according to embodiments described herein.

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or to similar components. Generally, only the differences with respect to the individual embodiments are described. Unless specified otherwise, the description of a part or aspect in one embodiment can be applied to a corresponding part or aspect in another embodiment as well.

Generally, HV cables include a conductor, an insulating layer, shield wires, and an outer sheath. More particularly, an inner conductive layer is provided between the conductor and the insulating layer, and an outer conductive layer is provided on an outer side of the insulating layer. In the context of the present disclosure, when referring to an HV cable it is understood that a cable lug is installed at the ends of the HV cable.

In the context of the present disclosure, a cable lug is understood to be a HV cable lug configured to be installed on a HV cable to create an electrical connection between the HV cable and an electrical HV unit. The cable lug typically comprises a first part which is configured to be installed on the HV cable, to create an electrical connection between the cable lug and the conductor of the HV cable. The cable lug may comprise a second part, which is electrically connected to the first part. The first part of the cable lug and the second part of the cable lug can be integrally formed. The second part may be configured to form an electrical connection to the electrical HV unit, for example a conductive core of a HV plug-connector described herein. The second part can comprise an opening configured to insert a screw. The screw can engage an internal thread of a system, for example an internal thread of a conductive core of a HV plug-connector described herein, to attach the cable lug. Typically, the first part and the second part are formed along the same direction, such that the cable lug is straight, i.e. without a bent. The straight design of the cable lug is beneficial for HV application to avoid high electric field strength at edges, for example at the bending. Some cable lugs can be formed with the second part oriented at an angle to the first part.

In the context of the present disclosure, an electrical HV unit can be any electrical device suitable to operate or suitable to be exposed to HV. An electrical HV unit can be, for example, a HV transformer or a HV gas-insulated switchgear (HVGIS). An electrical HV unit can also be a HV plug-connector, HV socket-connector or a HV L-connector according to embodiments described herein. In the context of the present disclosure, a high voltage (HV) is particularly to be understood as a voltage above 36 kV in accordance to e.g. IEC 60840.

According to an embodiment a high-voltage (HV) plug-connector is described. The HV plug connector comprising a conductive core and a bushing isolating the conductive core. The bushing comprising a first isolation part isolating a first portion of the conductive core, wherein an outer surface of the first isolation part comprises a conical surface, a second isolation part isolating a second portion of the conductive core and a mounting part extending radially beyond the first isolation part and the second isolation part. The first isolation part and the first portion of the conductive core form a plug and the HV plug-connector is configured to be installed in an electrical HV unit to form an electrical connection between the second portion of the conductive core and the electrical HV unit in a way that the plug extends outwards of the electrical HV unit.

FIG. 1 is a schematic view of a HV plug-connector 100 according to embodiments described herein. The HV plug-connector 100 includes a conductive core 110. In some embodiments, which can be combined with other embodiments, the conductive core comprises a first end with a first internal thread 115 and a second end with a second internal thread 120.

The conductive core can have a first portion 150, extending from the first end towards the second end, and a second portion 170, extending from the second end towards the first end. The first portion 150 and the second portion 170 are not overlapping. The first portion 150 and the second portion 170 can be integrally formed. Particularly, the first portion 150 and the second portion 170 can extend to the same location of the conductive core, for example, the geometrical center between the first end and the second end of the conductive core. The first end of the conductive core can correspond to an end of the first portion 150. The second end of the conductive core can correspond an end of the second portion 170.

Typically, the conductive core is straight. Particularly, the conductive core is not bent. The conductive core can be bent, such that the HV plug-connector forms can create an angled connection between a system connected to the first end of the conductive core and a system connected to the second end of the conductive core. In one embodiment the conductive core is bent to form an angle between the first portion 150 and the second portion 170. The angle can be more than 75° and less than 105°, particularly more than 80° and less then 100°, particularly more than 85° and less than 95°, particularly the angle can be such that the HV plug-connector comprising the conductive core essentially forms an L-connector.

The HV plug-connector 100 includes a bushing 130 isolating the conductive core 110. The bushing can include a channel, the channel can have a diameter corresponding to the outer diameter of the conductive core. The channel can be configured such that the conductive core 110 can be placed inside the bushing 130 in a way that the bushing 130 is connected mechanically tight to the conductive core 110. The inner surface of the channel can contact the conductive core. The bushing includes a first isolation part 140, isolating the first portion 150 of the conductive core, a second isolation part 160, isolating the second portion 170 of the conductive core, and a mounting part 180.

The first isolation part 140 has an outer surface 145. The outer surface 145 includes a conical surface. The first isolation part 140 can form a cone, the base of the cone being located within the area of the first portion 150 of the conductive core and the top of the cone being located at the first end of the conductive core. The outer surface 145 has a taper angle, such that the conical surfaces tapers off towards the first end of the conductive core. Particularly, the cone has the taper angle, such that the cone tapers off from the base towards the top. The first isolation part 140 and the first portion of the conductive core form a plug. Particularly, the first isolation part 140 has a shape of a plug configured such that a HV socket-connector can be plugged mechanically tight onto the first isolation part.

The second isolation part 160 has an outer surface 165. The second isolation part is configured to be installed in an electrical HV unit. The outer surface 165 can include a conical surface. The second isolation part 160 can form a cone, the base of the cone being located within the area of the second portion 170 of the conductive core and the top of the cone being located at the second end of the conductive core. The outer surface 165 has a taper angle, such that the conical surface tapers off towards the second end of the conductive core. Particularly, the cone has the taper angle, such that the cone tapers off from the base towards the top. In further embodiments, the outer surface 165 can include other suitable surfaces, for example, cylindrical surfaces. The shape of the outer surface 165 can depend on the electrical HV unit in which the HV plug-connector is to be installed.

The mounting part 180 extends radially beyond the first isolation part and the second isolation part. The mounting part 180 is configured to mount the HV plug-connector to the electrical HV unit. The mounting part 180 can be clamped to the HV plug-connector. The mounting part 180 comprises a mounting shoulder 185. A mounting ring, for example a clamping flange, can clamp the mounting part 180 to the electrical HV unit. In some embodiments, which can be combined with other embodiments described herein, the mounting part is located between the first isolation part and the second isolation part.

The HV plug-connector 100 according to embodiments described herein can be installed in an electrical HV unit to create an electrical connection between the electrical HV unit and the second portion 170 of the conductive core. The HV plug-connector 100 can be installed in a way that the first portion 150 of the conductive core and the first isolation part 140 extends outwards of the electrical HV unit. The first isolation part 140 and the first portion 150 form a plug. An HV socket-connector according to embodiments described herein can be plugged on the plug to create an electrical connection between an HV cable and the conductive core, to connect the HV cable to the electrical HV unit.

According to one embodiment an HV plug-connector is provided, wherein the shape of the second isolation part corresponds to the shape of the first isolation part. In particular, the taper angle of the outer surface 165 of the second isolation part corresponds to the taper angle of the outer surface 145 of the first isolation part. The second isolation part and the second portion 170 of the conductive core form a second plug. The second plug corresponds to the plug formed by the first isolation part 140 and first portion 150 of the conductive core. Particularly, the second plug is configured that an HV socket-connector can be plugged on the second plug to create an electric connection between the HV cable and the conductive core. The HV plug-connector comprises two identical plugs and is configured to create an electrical connection between two HV socket-connectors, particularly between two HV cables via two HV socket-connectors. The HV plug-connector can be a coupling piece between two HV socket-connector. The conductive core can be straight or can be bent to provide for an angled connection. The shape of the HV plug-connector can be, for example, a straight connector, a L-connector or a U-connector.

In some embodiments, which can be combined with other embodiments described herein, the bushing has a dielectric breakdown voltage higher than 20 kV/mm. The bushing prevents an electrical shortcut between the conductive core and the surroundings of the bushing. The conductive core can have a circular cross section with a diameter of 32 mm or more, particularly 40 mm or more. The electrical conductance of the conductive core is higher than 30 MS/m. Particularly, the electrical conductance of the conductive core is such, that the heat dissipated in the conductive core due the current flow can be conducted by the bushing, without damaging the bushing.

In some embodiments, which can be combined with other embodiments described herein, the electrical HV unit can be a HV gas-insulated switchgear (HVGIS) or a HV transformer. The electrical HV unit can be located in a wind turbine generator (WTG) system. Particularly, the HV plug-connector can be installed in a HV transformer located in a nacelle of a WTG system.

According to one embodiment, a high voltage (HV) socket-connector is described. The HV socket-connector comprising a first channel configured to insert a HV cable with a cable lug and a second channel having openings, an inner surface of the openings comprising a conical surface. The second channel is overlapping the first channel and an opening of the cable lug aligns with a center line of the second channel.

The HV socket-connector can be configured to create an electrical connection with an HV plug-connector as described herein. The openings of the HV socket-connector are configured to be plugged on the plug of the HV plug connector according to embodiments described herein, to align the conductive core of the HV plug connector with the center line of the second channel. The inner surface of the openings, comprising a conical surface, can be tapering off inwards of the channel. Particularly, a taper angle of the inner surface of the openings comprising a conical surface of the HV socket-connector corresponds to a taper angle of the first isolation part of the HV plug-connector. The openings can have a shape corresponding to the plug of the HV plug-connector, such that the inner surface of the openings can be connected mechanically tight to the plug of the HV plug-connector.

Figure 2:
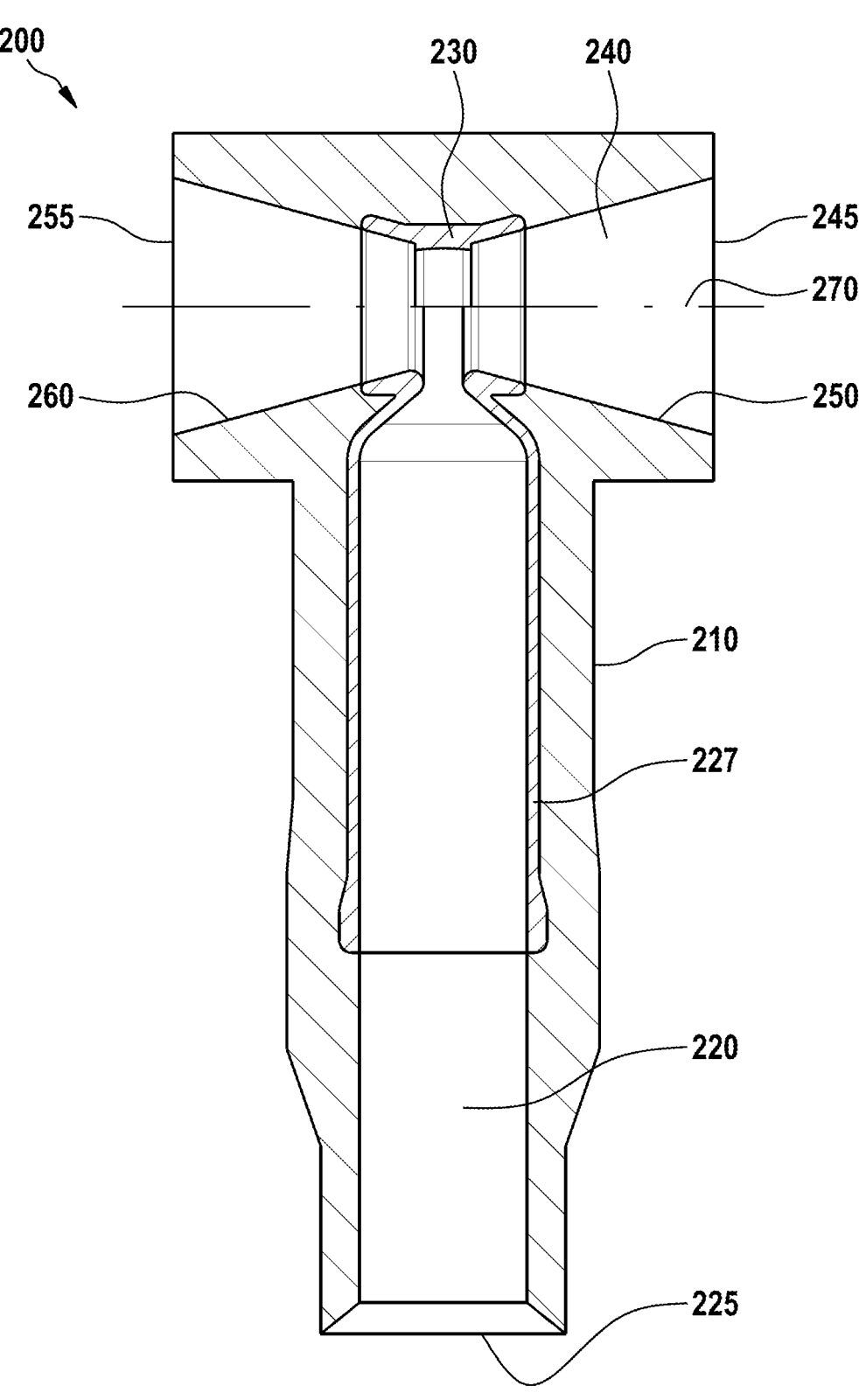
FIG. 2 shows a schematic view of a HV socket-connector according to embodiments described herein.

FIG. 2 shows a schematic view of a HV socket-connector 200 according to embodiments described herein. The socket connector comprises a body 210. The body can be made from electrically isolating material. Particularly, the body can have a dielectric breakdown voltage higher than 20 kV/mm. In some embodiments, which can be combined with other embodiments described herein, the HV socket-connector has a dielectric breakdown voltage higher than 20 kV/mm.

The HV socket-connector 200 includes a first channel 220 with a first opening 225. The first channel is formed in the body 210 of the HV socket-connector. The diameter of the first channel can correspond to the diameter of the core insulation of an HV cable. The diameter of the first channel can be such that the HV socket-connector can be firmly pushed on the core insulation of an HV cable in a way that the inner surface of the first channel 220 contacts the HV cable mechanically tight.

In some embodiments, which can be combined with other embodiments described herein, the HV socket-connector comprises a field control element 227 (designated 315 in FIG. 3) which is integrally formed with the HV socket-connector. In particular, the field control element 227 is comprised in the first channel. Varied and high frequencies can cause heat loss in the HV socket-connector, which can lead to a breakdown of the HV socket-connector. The field control element limits the heat generation in the HV socket-connector and makes the HV socket-connector more reliable. The integral design of the field control element 227 requires no further installation of a field control element on the HV cable. The HV socket-connector can be directly pushed on the HV cable, which allows for an easy and fast installation.

At an end of the first channel, opposite of the opening 225 of the first channel, the first channel can be narrowing down. The first channel can be narrowing down to form an opening, which allows the cable lug installed on the HV cable to be inserted in a cable lug insertion area 230. The cable lug insertion area can be located at the end of the first channel, opposite of the opening 225. The opening can correspond to a slit opening. Advantageously, a cable lug inserted into the cable lug insertion area 230 through the slit opening, is already aligned.

The HV socket-connector comprises a second channel 240 including a first opening 245 and a second opening 255. The second channel includes a center line 270. The first opening 245 has an inner surface 250 including a conical surface. The second opening 255 has an inner surface 260 including a conical surface. The inner surface 250, 260 can be tapering off inwards of the second channel 240. In particular, a taper angle of the inner surface 250, 260 can correspond to the taper angle of the first isolation part of an HV plug-connector according to embodiments described herein.

The second channel is overlapping the first channel. In some embodiments, which can be combined with other embodiments described herein, the second channel is oriented perpendicular to the first channel. Particularly, to form a T-connector. The second channel can overlap the first channel at the end of the first channel, opposite of the opening 225. Particularly, the second channel can overlap the cable lug insertion area 230 of the first channel 220. The opening of the cable lug inserted through the slit opening into the cable lug insertion area 230 can align with the second channel 240. Particularly, the opening of the cable lug inserted can align with the center line 270 of the second channel 240.

According to one embodiment, a high-voltage (HV) connection system is described. The HV connection system includes a HV plug-connector according to embodiments described herein and a HV socket-connector according to embodiments described herein. The HV plug-connector is installed in an electrical HV unit to form an electrical connection between the second portion of the conductive core and the electrical HV unit in a way that the plug extends outwards of the electrical HV unit. One opening of the HV socket-connector is plugged on the plug of the HV plug-connector to align the conductive core with the center line of the second channel. An electric connection is created between the cable lug and the conductive core.

Figure 3:
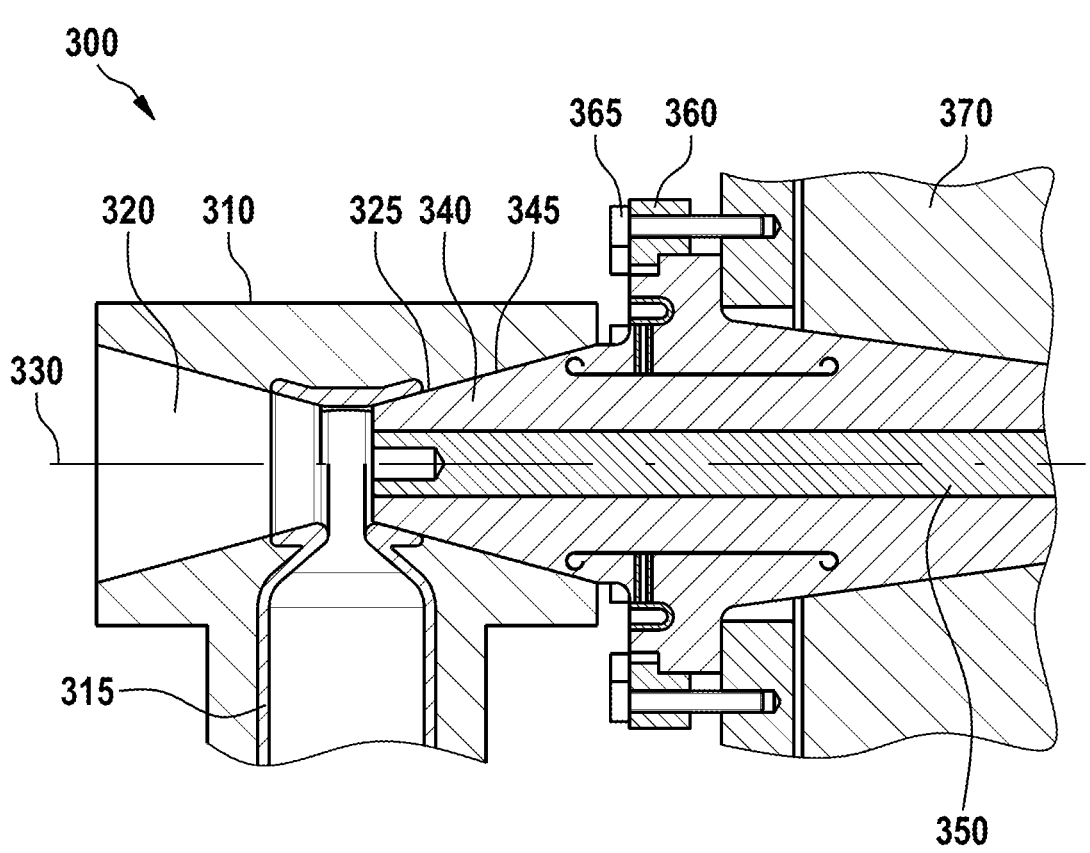
FIG. 3 shows a schematic view of a HV connection system, including an HV plug-connector and an HV-socket connector, according to embodiments described herein.

In FIG. 3 a schematic view of a HV connection system 300 according to embodiments described herein is shown. The HV connection system 300 includes a HV socket-connector 310 and a HV plug-connector 340.

The HV plug-connector 340 can be installed in an electrical HV unit 370. The second isolation part of the HV plug-connector extends inwards of the electrical HV unit 370. An electrical connection can be created between the second portion of the conductive core 350 and the electrical HV unit 370 (not shown). Particularly, an electrical connection can be created by connecting the HV plug-connector to the electrical HV unit via a screw engaging the second internal thread of the conductive core.

The HV plug-connector 340 can be mounted to the electrical HV unit 370 via the mounting part. A mounting ring 360 can be placed on the mounting shoulder of the mounting part. The HV plug-connector 340 can be clamped via the mounting ring 360. The mounting ring 360 can be fixed to the electrical HV unit by mounting screws 365 engaging with internal threads of the electrical HV unit.

The HV socket-connector 310 can be plugged on the HV plug-connector 340. Particularly, one opening of the HV socket-connector 310 can be plugged on the plug of the HV plug-connector 340. A taper angle 325 of the openings of the HV socket-connector 310 corresponds to a taper angle 345 of the first isolation part of the HV plug-connector 340. The matching taper angles advantageously provide a mechanically tight connection between the HV socket-connector 310 and the HV plug-connector 340.

The conical surface of the openings of the HV socket-connector 310 and the conical surface of the first isolation part of the HV plug-connector 340 can facilitate an alignment of the HV socket-connector and the HV plug-connector when plugged together. The conductive core 350 can be aligned with the center line 330 of the second channel 320, when the HV socket-connector is plugged on the HV plug-connector. Particularly, the first internal thread of the conductive core can align with the opening of the cable lug. The cable lug can be connected to the conductive core by a screw inserted in the opening of the cable lug and engaging the first internal thread of the conductive core to create an electrical connection.

The HV connection system 300 connects the HV cable to the electrical HV unit via the cable lug and the conductive core. The HV plug-connector extends outwards of the electrical HV unit. A HV cable can be electrically connected to the electrical HV unit by inserting the HV cable in the HV socket-connector and plugging the HV socket-connector on the HV plug-connector. The HV connection system 300 allows to connect HV cables to electrical HV units in a fast manner, by plugging the HV socket-connector on the HV plug-connector. For example, during installation, the HV cable can be laid out for the required length and inserted in the HV plug-connector. The HV plug-connector can be panned on the HV socket-connector. It is not required to move the HV cable in a longitudinal direction, for example push or pull. The HV cable can be connected to the electrical HV unit at an angle with respect to a direction of extension of the HV cable. The HV cables can be electrically connected to the electrical HV unit perpendicular to the direction of extension of the HV cable. Particularly, the HV cables can be installed to have an angle of more than 85° and less than 95° between the electrical HV unit and the direction of extension. The HV cables can be connected the electrical HV unit without bending the HV cable. The HV connection system can provide a HV connection in a narrow space, for example, inside a wind turbine generator (WTG) system. Particularly, an off-shore WTG system.

HV systems have higher load requirements as compared to medium voltage (MV) systems. At the connection of the HV cable to the electrical HV unit, the HV can result in very high electrical field strength, for example at edges. To maintain the same safety standards, the HV system and particularly the HV connection system, needs be designed specifically for the higher load requirements, for example, increased conductor size of the HV cable and increased dielectric breakdown of the insulation. The HV connection system according to embodiments described herein, particularly the HV plug-connector and the HV socket-connector according to embodiments described herein, are designed to provide a save and stable connection between the HV cable and the HV electrical unit. The HV plug-connectors and the HV socket-connectors each have a dielectric breakdown voltage higher than 20 kV/mm, to provide a save electrical HV connection. Generally, this results in increased design requirements of the HV connection system, due to increased HV cable diameters and increased insulation size, and limits the application areas. The design of the HV socket-connector and the HV plug-connector according to embodiments described herein provides for a HV connection systems with minimal space requirements and fast installation. The connection can be ideally formed without bending the HV cables and the HV socket-connector can be panned on the HV plug-connector According to one embodiment, a wind turbine generator (WTG) system comprising a HV transformer, a HV gas-insulated switching gear (HVGIS) and for each phase of the transformer a HV cable is described. At least for one phase, the HV cable is inserted in the first channel of a HV socket-connector according to embodiments described herein, to align a cable lug of the HV cable with the center line of the second channel of the HV socket-connector, a HV-plug connector according to embodiments described herein is installed in the HV transformer to form an electrical connection between the second portion of the conductive core and the HV transformer in a way that the plug extends outwards of the transformer, one opening of the HV socket-connector is plugged on the plug of the HV plug connector to align the conductive core with the center line of the second channel and an electrical connection is created between the cable lug and the conductive core to electrically connect the HV cable to the HV transformer and the HV cable is electrically connected to the HVGIS.

Figure 4:
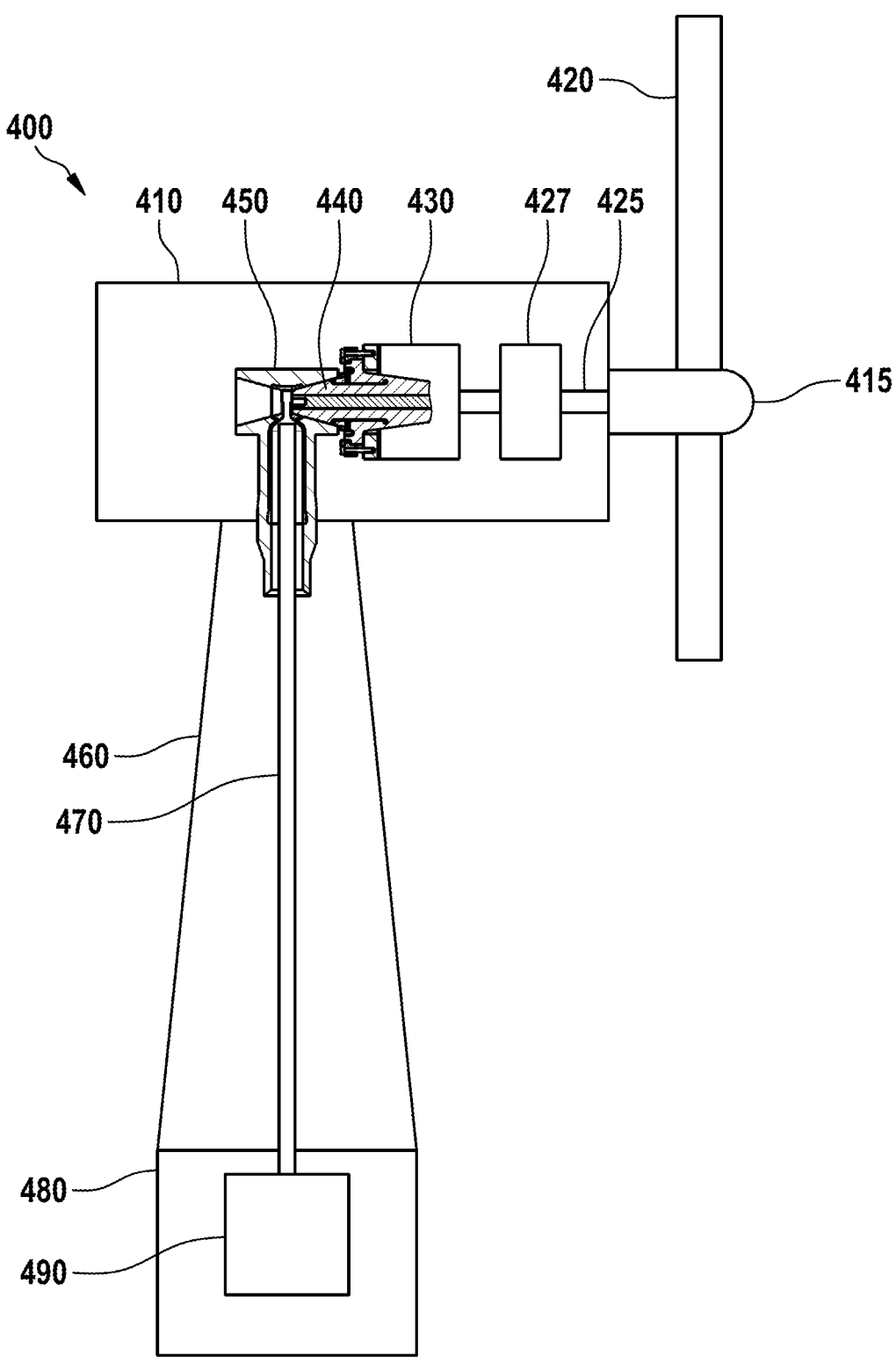
FIG. 4 shows a schematic view of a wind turbine generator system including an HV connection system according to embodiments described herein.

FIG. 4 is a schematic view of a WTG system 400 including a HV transformer, a HVGIS and a HV cable. The WTG system 400 comprises a rotor 415 with at least one blade 420, a nacelle 410, a tower 460 and a base 480.

The nacelle 410 is placed atop the tower 460. Inside the nacelle, a rotor shaft assembly 425 transmits the rotational energy of the rotor to a generator 427. The generator transforms the rotational energy into electrical energy, which is transmitted to a transformer 430. The transformer 430 can act a counterweight to the rotor 415 and the blades 420.

A HV connection system according to embodiments described herein can be provided, to connect a HV cable 470 to the transformer 430. The HV connection system comprises a HV plug-connector 450 and a HV socket-connector 440. The HV plug-connector can be installed in the transformer to create an electrical connection between the second portion of the conductive core and transformer in a way that the plug extends outwards of the transformer. The HV cable 470 can be inserted in the HV socket-connector to align the cable lug of the HV cable with the center line of the second channel. One opening of the HV socket-connector can be plugged on the plug of the HV plug-connector to connect the HV cable to the conductive core. The HV cable can be connected to the transformer via the cable lug and the conductive core.

The HV cable can be connected to the transformer without bending the HV cable. The HV cable can be guided through the tower 460 towards the base 480. A HVGIS 490 can be located in the base 480 of the WTG system 400. The HV cable can be electrically connected to the HVGIS.

According to some embodiments, which can be combined with other embodiments described herein, the HV transformer is located in a nacelle of the WTG system and the HVGIS is located at a base of the WTG system. Particularly, the HV cable is located in a tower of the WTG system.

According to one embodiment, a high voltage (HV) L-connector is described. The HV L-connector includes a first channel configured to insert a HV cable with a cable lug; and a conductive core. The conductive core extends perpendicular to the first channel and is oriented in a way that the cable lug can be connected to the conductive core. A body of the L-connector has an isolation part, the isolation part is isolating the conductive core and an outer surface of the isolation part includes a conical surface. The isolation part and the conductive core form a plug. Particularly, the isolation part and the conductive core form a plug corresponding to the plug formed by the first isolation part and the first portion of the conductive core of a HV plug-connector.

The HV L-connector is configured to be plugged in one opening of an HV socket-connector to create an electrical connection between the conductive core of the HV L-connector and the cable lug of the HV socket-connector. For example, one opening of the HV socket-connector can be plugged on the plug of a HV plug-connector installed in an electrical HV unit to create an electrical connection between the electrical HV unit and a first HV cable inserted in the HV socket-connector. The electrical HV unit and the first HV cable are electrically connected via the conductive core of the HV plug-connector and a first cable lug of the first HV cable. The HV L-connector can be plugged in a further opening of the HV socket-connector to create an electrical connection between a second HV cable inserted in the HV L-connector, the first HV cable and the electrical HV unit. The second HV cable, the first HV cable and the electrical HV unit are electrically connected via the first cable lug, the second cable lug, the conductive core of the HV plug-connector and the conductive core of the HV L-connector.

Figure 5:
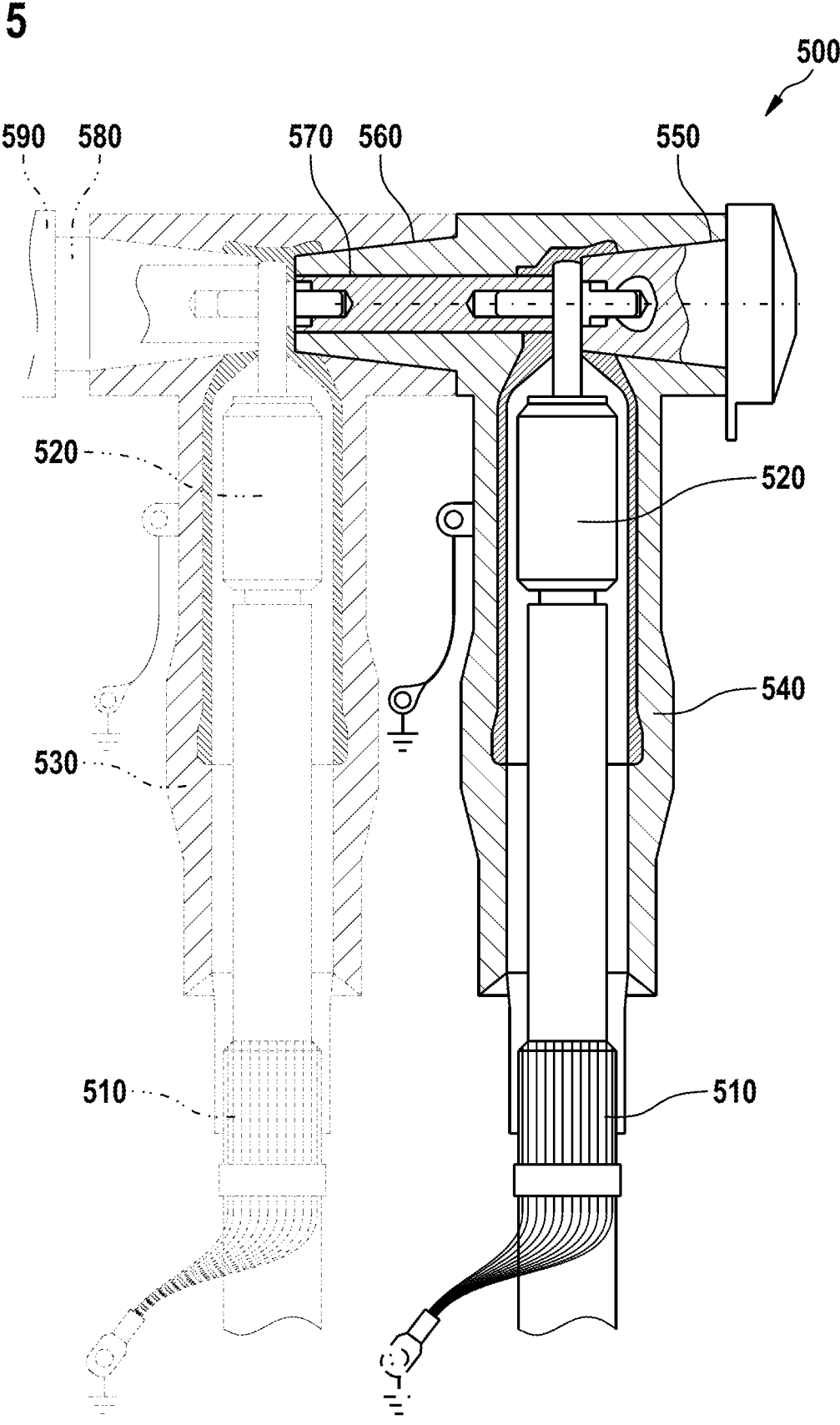
FIG. 5 shows a schematic view of a HV connection, including an HV plug-connector, a HV-socket-connector and a HV L-connector, according to embodiments described herein.

FIG. 5 shows a schematic view of a HV connection system 500, including a HV socket-connector 530, a HV L-connector 540 and a HV plug-connector 580, according to embodiments described herein. The HV plug-connector 580 is installed in an electrical HV unit 590 to form an electrical connection between the second portion of the conductive core and the electrical HV unit in a way that the plug extends outwards of the electrical HV unit.

A first HV cable 510 with a first cable lug 520 is inserted in the HV socket-connector 530. One opening of the HV socket-connector 530 is plugged on the plug of the HV plug-connector 580 to electrically connect the first HV cable to the electrical HV unit. The opening of the first cable lug is aligned with the conductive core of the HV plug-connector. The cable lug is connected to the conductive core of the HV plug-connector to create an electrical connection between the first cable lug and the conductive core of the HV plug-connector. An electrical connection is created between the first HV cable and the electrical HV unit via the first cable lug and the conductive core of the HV plug-connector.

A second HV cable 510 with a second cable lug 520 is inserted in the HV L-connector 540. The second cable lug is connected to a conductive core 570 of the HV L-connector to create an electrical connection between the second cable lug and the conductive core of the HV L-connector. An electrical connection between the conductive core of the HV L-connector and the second HV cable is created via the second cable lug. A blind plug 550 can be used to insulate an opening of the HV L-connector.

The plug of the HV L-connector, formed by the conductive core 570 and an isolation part 560, is plugged in the HV socket-connector to form an electrical connection between the electrical HV unit, the first HV cable and the second HV cable. The opening of the first cable lug is aligned with the conductive core of the HV L-connector. The first cable lug is connected to the conductive core of the HV L-connector to create an electrical connection between the first cable lug and the conductive core of the HV L-connector. An electrical connection is created between the first HV cable, the second HV cable and the electrical HV unit via the first cable lug, the second cable lug, the conductive core of the HV plug-connector and the conductive core of the HV L-connector.

In some embodiments, which can be combined with other embodiments described herein, the HV cable inserted in the L-connector can be connected to a surge arrester. Particularly, the L-connector can be integrally formed with the surge arrester in a way that an electric connection is created between the conductive core and the surge arrester.

While the foregoing is directed to embodiments, other and further embodiments may be devised without departing from the basic scope of the application, and the scope thereof is determined by the claims that follow.

The invention claimed is:

1. A high-voltage (HV) plug-connector, the HV plug-connector comprising:
a conductive core; and
a bushing isolating the conductive core, the bushing comprising:
a first isolation part isolating a first portion of the conductive core, wherein an outer surface of the first isolation part includes a conical surface;
a second isolation part isolating a second portion of the conductive core;
a mounting part extending radially beyond the first isolation part and the second isolation part, the mounting part comprising a mounting shoulder; and
a mounting ring configured to be placed on the mounting shoulder;
wherein the first isolation part and the first portion of the conductive core form a plug, and the HV plug-connector is configured to be installed in an electrical HV unit to form an electrical connection between the second portion of the conductive core and the electrical HV unit in a way that the plug extends outwards of the electrical HV unit, and wherein the bushing has a dielectric breakdown voltage higher than 20 kV/mm, the HV plug-connector being configured to be clamped to the HV electrical unit via the mounting ring.

2. The HV plug-connector of claim 1, wherein the mounting part is located between the first isolation part and the second isolation part.

3. The HV plug-connector according to claim 1, wherein the electric conductance of the conductive core is higher than 30 MS/m.

4. The HV plug-connector according to claim 1, wherein the conductive core comprises a first end with a first internal thread and a second end with a second internal thread.

5. The HV plug-connector according to claim 1, wherein the electrical HV unit is a HV gas-insulated switchgear (HVGIS) or a HV transformer.

6. The HV plug-connector according to claim 2, wherein the electric conductance of the conductive core is higher than 30 MS/m.

7. The HV plug-connector according to claim 2, wherein the conductive core comprises a first end with a first internal thread and a second end with a second internal thread.

8. The HV plug-connector according to claim 2, wherein the electrical HV unit is a HV gas-insulated switchgear (HVGIS) or a HV transformer.

9. A high-voltage (HV) connection system, the HV connection system comprising:
a HV plug-connector including:
a conductive core; and
a bushing isolating the conductive core, the bushing having:
a first isolation part isolating a first portion of the conductive core, wherein an outer surface of the first isolation part includes a conical surface;
a second isolation part isolating a second portion of the conductive core;

a mounting part extending radially beyond the first isolation part and the second isolation part, the mounting part comprising a mounting shoulder; and
a mounting ring configured to be placed on the mounting shoulder;
wherein the first isolation part and the first portion of the conductive core form a plug, and wherein the bushing has a dielectric breakdown voltage higher than 20 kV/mm, the HV plug-connector being configured to be clamped to the HV electrical unit via the mounting ring, and
a HV socket-connector including:
a first channel configured to insert a HV cable with a cable lug; and
a second channel having openings, an inner surface of the openings including a conical surface;
wherein the second channel is overlapping the first channel and an opening of the cable lug aligns with a center line of the second channel; and
wherein the HV socket-connector has a dielectric breakdown voltage higher than 20 kV/mm;
wherein the HV plug-connector is installed in an electrical HV unit to form an electrical connection between the second portion of the conductive core and the electrical HV unit in a way that the plug extends outwards of the electrical HV unit;
wherein one opening of the HV socket-connector is plugged on the plug of the HV plug-connector to align the conductive core with the center line of the second channel; and
wherein an electric connection is created between the cable lug and the conductive core.

10. A wind turbine generator (WTG) system comprising a HV transformer, a HV gas-insulated switching gear (HV-GIS) and for each phase of the transformer a HV cable, wherein:
at least for one phase:
a HV socket-connector including:
a first channel configured to insert the HV cable with a cable lug; and
a second channel having openings, an inner surface of the openings including a conical surface;
wherein the second channel is overlapping the first channel and an opening of the cable lug aligns with a center line of the second channel, and
wherein the HV socket-connector has a dielectric breakdown voltage higher than 20 kV/mm,
the HV cable is inserted in the first channel of the HV socket-connector to align the cable lug of the HV cable with the center line of the second channel of the HV socket-connector;
a HV plug-connector including:
a conductive core; and
a bushing isolating the conductive core, the bushing comprising:
a first isolation part isolating a first portion of the conductive core, wherein an outer surface of the first isolation part includes a conical surface;
a second isolation part isolating a second portion of the conductive core;
a mounting part extending radially beyond the first isolation part and the second isolation part, the mounting part comprising a mounting shoulder; and
a mounting ring configured to be placed on the mounting shoulder;

wherein the first isolation part and the first portion of the conductive core form a plug, and the HV plug-connector is configured to be installed in an electrical HV unit to form an electrical connection between the second portion of the conductive core and the elec- trical HV unit in a way that the plug extends out- wards of the of the electrical HV unit, and wherein the bushing has a dielectric breakdown voltage higher than 20 kV/mm, the HV plug-connector being configured to be clamped to the HV electrical unit via the mounting ring, and the HV plug-connector is installed in the HV transformer to form an electrical connection between the second portion of the conductive core and the HV transformer in a way that the plug extends outwards of the trans- former;

one opening of the HV socket-connector is plugged on the plug of the HV plug connector to align the conductive core with the center line of the second channel;

an electrical connection is created between the cable lug and the conductive core to electrically connect the HV cable to the HV transformer; and the HV cable is electrically connected to the HVGIS.

11. The WTG system according to claim 10, wherein the HV transformer is located in a nacelle of the WTG system; and the HVGIS is located at a base of the WTG system.

\* \* \* \* \*